Figure 1:
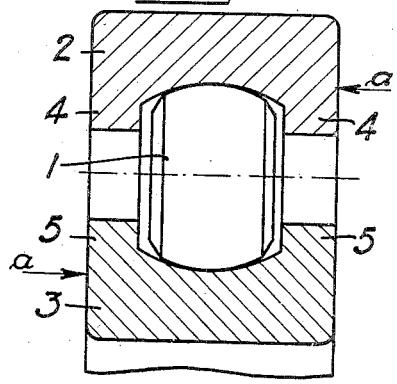

April 26, 1927.

K. O. LEON

ROLLER BEARING FOR RADIAL AND AXIAL LOADS

Filed Sept. 9, 1925

Inventor
Karl Oskar Leon,
By Henry Orth
atty.

Patented Apr. 26, 1927.

1,625,812

UNITED STATES PATENT OFFICE.

KARL OSKAR LEON, OF LIDKOPING, SWEDEN.

ROLLER BEARING FOR RADIAL AND AXIAL LOADS.

Application filed September 9, 1925, Serial No. 55,282, and in Sweden March 28, 1925.

This invention relates to roller bearings for radial and axial loads of the type in which the rollers normally run with their axes parallel to the axis of the bearing but under the action of an axial load automatically adjust themselves into oblique positions in a direction opposite to the couple of forces formed by the axial pressures from the inner and outer rings so as to be able to take up said load. As is well-known the condition for such operation of the rollers in a roller bearing in which the rollers normally run with the roller axes parallel to the bearing axis is that the mantle surface of the rollers is convex with a generatrix the radius of curvature of which is somewhat larger than the radius of the axial projection of the roller and that the race rings have concave races with a radius of curvature in the axial plane that in both races or at least in one of them is somewhat larger than the radius of curvature of the roller in the axial plane but essentially less than the radius struck from the center of the bearing to the race of the outer ring. The transfer of the axial load through the obliquely adjusted rollers takes place in such case on small contact surfaces diametrically opposed at the side of the middle plane of the rollers. As the normals in the contact points, when the contact surfaces are undeformed, on account of the shape of the roller form parallel non-coincident lines but the directions of the pressures when the rollers have adjusted themselves into oblique positions and run in equilibrio must be in alignment with each other, it may be inferred that the material in the contact points is highly deformed under the influence of an axial load, the contact pressure being concentrated essentially towards one side of the contact surface.

The object of the present invention is, chiefly, to facilitate the transferring of axial loads in roller bearings of the kind above stated and to effect a limitation and an equalizing of the contact pressure between the races and the rollers in transferring axial loads through the rollers. The invention consists, chiefly, in the provision of flanges at the sides of the races adapted to limit the oblique positioning of the rollers under the influence of axial loads, said flanges having on each ring an axial distance from each other that is somewhat larger than the axial length of the rollers so that the latter when running normally are out of contact with the flanges but when the bearing is subjected to an axial load and the rollers on account thereof adjust themselves into oblique position, come into contact with the flanges by means of conical or otherwise shaped curved surfaces whereupon a part of the axial load is transferred through said flanges.

The pressures exerted by the flanges against the rollers effect a moment which tends to raise the roller from its oblique position. As the rollers must be in equilibrium when rolling the contact pressures against the races must, accordingly cause an oppositely acting tilting moment. This moment arises by the contact pressures in the contact points at the races being caused under the influence of the first-mentioned moment to alter their direction so that they act along non-coincident lines which are more or less coincident with the directions of the normals in the contact points before the contact surfaces have been deformed. On account thereof the pressure in the contact surfaces will be more uniformly distributed and an overloading of the material is prevented.

Figure 2:
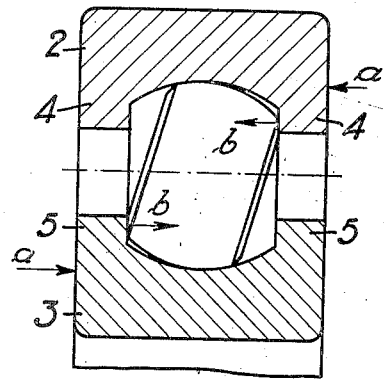
Figure 3:
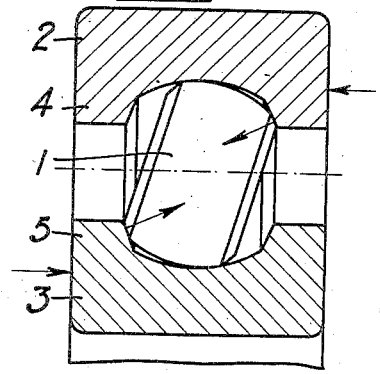
Figure 4:
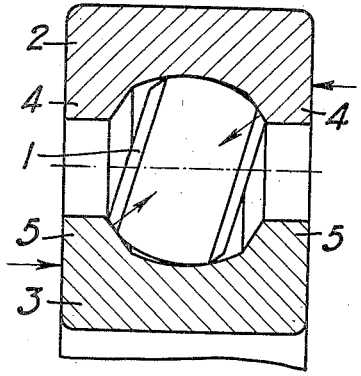

In the accompanying drawings I have shown some embodiments of my invention. Fig. 1 shows a partial axial section of a roller bearing according to this invention, with the roller in normal position. Fig. 2 shows a section of said roller bearing with the roller in oblique position for transferring an axial load. Figs. 3 and 4 show similar sections of other embodiments of the invention.

Referring to Figs. 1 and 2, the rollers 1 have convex mantle surface with a generatrix the radius of curvature of which is somewhat larger, for instance 20% larger, than the radius of the axial projection of the roller. The race rings 2 and 3 have concave races the generatrices of which have a somewhat larger radius than the radius of the generatrix of the roller. At each side of the two races rigid flanges 4, 5 are provided the inner surfaces of said flanges being positioned substantially at right angles to the axis of the bearing and having on each ring a distance from each other that is somewhat larger than the axial length of the rollers so that the rollers can tilt laterally to a given extent, as for instance 10 to 15° before they will come into contact with the flanges. The end surfaces of the rollers are at the circumference conically tapered with a base angle corresponding to the tilting angle of the rollers when they come into contact with the flanges.

The rollers have accordingly essentially point contact at the races and when subjected to a radial load only they take up the position shown in Fig. 1 in which the axes of the rollers are parallel to the axis of the bearing. At an axial load, for instance in the direction indicated by the arrows $a$, $a$ in Figs. 1 and 2, the rollers are in well-known manner brought to take up an oblique position enabling the rollers to transmit said axial load and the inclination is increased as the axial load is increased until the conical faces of the roller ends come into contact with the inner surfaces of the flanges as indicated in Fig. 2. If the axial load now is further increased the flanges transmit a part of the axial load by pressing against the conical taperings of the ends of the rollers and said pressure causes a tilting moment acting on the rollers as indicated by the arrows $b$, $b$ which tends to turn up the rollers. Said tilting moment is however counteracted by the pressures in the contact points between the races and the mantle surfaces of the rollers being caused to alter their directions so that they set up a tilting moment counteracting the first-mentioned tilting moment. The rollers will accordingly continue to roll in contact with the flanges as long as the said axial load is maintained. By the said alteration of the direction of the pressures in the contact surfaces between the races and the mantle surfaces of the rollers an equalizing of the pressure in said contact surfaces is also attained so that an overloading of the material is avoided.

The embodiment shown in Fig. 3 differs from the embodiment above described by the inner contact surfaces of the flanges having a generatrix that is oblique in relation to the axis of the bearing while the base angle at the conical taperings of the rollers is correspondingly increased. By this arrangement an increased axial load can be transferred through the flanges in comparison with the embodiment shown in Figs. 1 and 2 without that the tilting moment caused by the flange pressure will be so large that it causes a too great and unsuitable altering of the direction of the pressures in the contact surfaces between the roller races and the mantle surfaces of the rollers. In the embodiment shown in Fig. 4 the contact surfaces of the flanges have such inclination that the normals in the diametrically opposed contact points are essentially in alignment with each other. In this case the flange pressures do not cause any tilting moment and they cannot accordingly have any influence on the direction of the pressure in the contact surfaces between the roller races and the mantle surfaces of the rollers but the arrangement has the feature that any increase of the axial load above the value which bring the rollers in contact with the flanges is directly transferred through the rollers from one flange of the inner race ring to the diametrically opposed flange of the outer race ring without that any increase of the contact pressure between the roller races and the mantle surfaces of the rollers will arise.

It is not necessary that the pressure surfaces of the flanges and the cooperating taperings of the rollers have conical form as is shown in Figs. 3 and 4 but said surfaces can have any other form with a curved generatrix, if desired.

The filling in of the rollers in bearings according to this invention can be effected according to known methods either by adjusting the race rings excentrically in relation to each other and introducing the rollers in the outer race rings through the opening thus formed, or by using filling openings in the shoulders of the race rings or by introducing the rollers in lying position and then turning them up into working position. If the rollers in excentrically filling in then are placed with the end surfaces against each other and after distribution around the circumference are turned 90° to the working position said turning is, preferably, carried out after the roller has been tilted to an oblique position, it being in such case eventually necessary to cut away the inner edges of two diametrically opposed flanges so much that the turning can take place. On filling in the rollers in lying position between concentrically disposed race rings filling openings are provided, if necessary, in both flanges at the same side of the race rings.

What I claim is:

1. Roller bearing for axial and radial loads, comprising inner and outer race rings having concave races, rollers between said race rings having convex mantle surface and tapered end surfaces, said rollers being adapted to adjust themselves into oblique positions when the bearing is subjected to axial load, and rigid flanges at the sides of the inner and outer races adapted to limit the oblique positioning of the rollers and to transfer axial load through the rollers.

2. Roller bearing for radial and axial loads, comprising inner and outer race rings having convex mantle surface and tapered end surfaces, said rollers being adapted to adjust themselves into oblique positions when the bearing is subjected to axial load, and rigid flanges at the sides of the inner and outer races having inner contact surfaces lying obliquely in relation to the axis of the bearing, said flanges being adapted to limit the tilting of the rollers when subjected to axial load and to transfer axial load through the rollers.

In testimony whereof I have signed my name.

KARL OSKAR LEON.